US012777420B2

(12) United States Patent
Xu et al.

(10) Patent No.: US 12,777,420 B2
(45) Date of Patent: Oct. 27, 2026

(54) WIRELESS COMMUNICATION METHOD AND RELATED APPARATUS

(71) Applicant: SUZHOU METABRAIN INTELLIGENT TECHNOLOGY CO., LTD., Suzhou (CN)

(72) Inventors: Yaming Xu, Suzhou (CN); Rengang Li, Suzhou (CN); Wei Liu, Suzhou (CN); Can Zhang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 374 days.

(21) Appl. No.: 18/569,141

(22) PCT Filed: Sep. 28, 2022

(86) PCT No.: PCT/CN2022/122338
§ 371 (c)(1),
(2) Date: Dec. 11, 2023

(87) PCT Pub. No.: WO2023/103549
PCT Pub. Date: Jun. 15, 2023

(65) Prior Publication Data
US 2024/0196332 A1 Jun. 13, 2024

(30) Foreign Application Priority Data
Dec. 10, 2021 (CN) ......................... 202111502750.5

(51) Int. Cl.
*H04W 52/02* (2009.01)

(52) U.S. Cl.
CPC ............................... *H04W 52/0235* (2013.01)

(58) Field of Classification Search
CPC ... H04L 1/1861; H04L 1/1864; H04L 5/0053; H04L 5/0091; H04L 1/00; H04L 5/00;
(Continued)

(56) References Cited

U.S. PATENT DOCUMENTS

2007/0147330 A1* 6/2007 Smith ............... H04W 52/0229 370/346
2017/0055217 A1* 2/2017 Sen .................. H04W 52/0229
(Continued)

FOREIGN PATENT DOCUMENTS

CN 101557408 A 10/2009
CN 106900000 A 6/2017
(Continued)

OTHER PUBLICATIONS

Chinese Search Report received for CN Application No. 2021115027505 on Jan. 13, 2022, 4 pgs.
International Search Report and Written Opinion received for PCT Serial No. PCT/CN2022/122338, on Dec. 21, 2022, 9 pgs.
R2-1802058, "Further Consideration on Wake-up Signal": 3G99 TSG-RAN WG2 Meeting #101, Athens, Greece, Feb. 26, 2018-Mar. 2, 2018, ZTE, Sanechips, 6 pgs.
(Continued)

*Primary Examiner* — Nathan S Taylor
(74) *Attorney, Agent, or Firm* — Merchant & Gould P.C.; Daniel J. Pereira

(57) ABSTRACT

Provided is a wireless communication method, including: monitoring, by a device node, a wake-up frame using a monitoring duration at a first wake-up interval, wherein the wake-up frame is a wake-up frame that is continuously sent by a collection node; in response to that the device node has detected the wake-up frame, monitoring, by the device node, the wake-up frame using the monitoring duration at a second wake-up interval, wherein the first wake-up interval is greater than the second wake-up interval, and a duration of the wake-up frame is greater than the monitoring duration; and in response to that the device node fails to detect the wake-up frame within a preset duration when monitoring the wake-up frame at the second wake-up interval, entering, by the device node, a receiving state, so as to perform wireless communication between the collection node and the device node.

18 Claims, 4 Drawing Sheets

(58) Field of Classification Search

CPC ... H04L 1/0041; H04L 1/0045; H04L 1/0069; H04L 1/08; H04L 5/0007; H04L 27/02; H04L 27/10; H04L 1/0026; H04L 27/2613; H04L 1/1829; H04L 27/26; H04W 52/08; H04W 52/146; H04W 52/325; H04W 52/362; H04W 52/367; H04W 52/54; H04W 72/044; H04W 72/23; H04W 52/32; H04W 72/04; H04W 72/1268; H04W 72/12; H04W 68/02; H04W 52/0216; H04W 72/232; H04W 52/0229; H04W 52/0235; H04W 52/028; H04W 68/005; H04W 72/1273; H04W 52/0225; H04W 72/231; H04W 76/19; H04W 76/27; H04W 84/12; H04W 24/08; H04W 68/025; H04W 76/28; H04W 88/02; H04W 88/08; H04W 16/14; H04W 4/70; H04W 48/18; H04W 48/20; H04W 52/0209; H04W 52/0219; H04W 52/0274; H04W 74/002; H04W 74/0833; H04W 88/06; H04W 92/10; H04W 48/10; H04W 74/0836; H04W 52/02; H04W 68/00; H04W 36/00; H04W 36/08; H04W 4/00; H04W 4/08; H04W 72/0446; H04W 72/0453; H04W 72/20; H04W 74/04; H04W 74/08; H04W 76/11; H04W 4/38; H04W 52/0248; Y02D 30/70; H02J 50/001; H02J 50/00; H04J 11/0069; H04M 1/00; H04M 1/725

See application file for complete search history.

(56) References Cited

U.S. PATENT DOCUMENTS

| | | | | |
|---|---|---|---|---|
| 2017/0181091 | A1* | 6/2017 | Cao | H04W 8/04 |
| 2018/0069683 | A1 | 3/2018 | Huang | |
| 2019/0319771 | A1* | 10/2019 | Huang | H04W 52/0222 |
| 2020/0053648 | A1* | 2/2020 | Guo | H04W 52/0229 |
| 2021/0168711 | A1 | 6/2021 | Zhang | |
| 2022/0191794 | A1* | 6/2022 | Pan | H04W 28/24 |
| 2022/0191795 | A1* | 6/2022 | Pan | H04W 52/0219 |
| 2023/0269666 | A1* | 8/2023 | Wu | H04W 52/0235<br>370/311 |
| 2024/0138001 | A1* | 4/2024 | Höglund | H04W 52/0274 |

FOREIGN PATENT DOCUMENTS

| | | | |
|---|---|---|---|
| CN | 106922011 | A | 7/2017 |
| CN | 107979866 | A | 5/2018 |
| CN | 110169144 | A | 8/2019 |
| CN | 110958672 | A | 4/2020 |
| CN | 111586814 | A | 8/2020 |
| CN | 113038578 | A | 6/2021 |
| CN | 113207160 | A | 8/2021 |
| CN | 113923763 | A | 1/2022 |
| EP | 3155848 | A1 | 4/2017 |
| WO | 2018149531 | A1 | 8/2018 |

OTHER PUBLICATIONS

Zhang, Jun., et al., "Lora", Internet Communication, China Academic Journal Electronic Publishing House, 2 pgs.

* cited by examiner

WIRELESS COMMUNICATION METHOD AND RELATED APPARATUS

CROSS-REFERENCE TO RELATED APPLICATION

This application is a National Stage Filing of the PCT International Application No. PCT/CN2022/122338 filed on Sep. 28, 2022, which claims priority to China Patent Application No. 202111502750.5, filed on Dec. 10, 2021, both applications of which are hereby incorporated by reference in their entirety.

TECHNICAL FIELD

The present disclosure relates to the technical field of data communications, and in particular, to a wireless communication method, a wireless communication system, a node device, and a non-volatile computer-readable storage medium.

BACKGROUND

With the continuous development of electronic technologies, more and more scenarios applying an Internet of Things technology have emerged. For example, device nodes arranged in an Internet of Things usually use wireless sensors to upload non-real-time industrial data, such as temperature, humidity, and production data. The above solution has the advantages of convenient deployment, no wiring, and low cost.

However, the inventors have realized that in related technologies, in order to reduce power and prolong the service life and lifespan of a battery, regular sleep is generally performed, and collection nodes adopt a certain policy to perform wireless wake-up communication. Usually, a device node wakes up at a certain interval to detect whether any collection node has communication requirements. The wake-up duration should cover two wake-up frames of the collection node to maintain the reliability and stability of the wireless wake-up communication. There will be a significant increase in power consumption of the device node in a wake-up interval relative to power consumption in a dormancy interval, resulting in an increase in average power consumption. This reduces the utilization rate of electric energy, and also increases the costs of using a device node.

SUMMARY

One aspect of embodiments of the present disclosure provides a wireless communication method, including:

monitoring, by a device node, a wake-up frame using a monitoring duration at a first wake-up interval, wherein the wake-up frame is a wake-up frame that is continuously sent by a collection node;

in response to that the device node has detected the wake-up frame, monitoring the wake-up frame using the monitoring duration at a second wake-up interval, wherein the first wake-up interval is greater than the second wake-up interval, and a duration of the wake-up frame is greater than the monitoring duration; and in response to that the device node fails to detect the wake-up frame within a preset duration when monitoring the wake-up frame at the second wake-up interval, entering, by the device node, a receiving state, so as to perform wireless communication between the collection node and the device node.

In some embodiments, a process of sending, by the collection node, the wake-up frame may include:

continuously sending, by the collection node, the wake-up frame for a set total duration; and entering a silent state after the sending of the wake-up frame is completed; and a process of performing the wireless communication between the collection node and the device node includes:

in response to that the silent state is maintained for the preset duration, sending, by the collection node, an id wake-up frame to the device node, so that the device node performs communication based on the id wake-up frame.

In some embodiments, the device node performs communication based on the id wake-up frame, which includes:

in response to that a control domain of the id wake-up frame is a function frame, sending, by the device node, corresponding service data to the collection node based on the function frame.

In some embodiments, the device node performs communication based on the id wake-up frame, which includes:

in response to that a control domain of the id wake-up frame is a wake-up frame, sending, by the device node, an acknowledgment frame to the collection node; and entering, by the device node, the receiving state.

In some embodiments, the wireless communication method may further include:

in response to receiving the acknowledgment frame, sending a collection frame by the collection node, so that the device node returns corresponding service data based on the collection frame; and receiving the service data and replying with an acknowledgment frame by the collection node.

In some embodiments, when the device node receives an id wake-up frame, the wireless communication method may further include:

acquiring a power consumption control field from the id wake-up frame; and setting, based on the power consumption control field, power used in a communication process.

In some embodiments, in response to that the device node enters the receiving state, the wireless communication method may further include:

in response to that no data is received within the preset duration, monitoring, by the device node, a wake-up frame using the monitoring duration at the first wake-up interval.

The embodiments of the present disclosure further provide a wireless communication system, including a device node and a collection node.

The device node is configured to monitor a wake-up frame using a monitoring duration at a first wake-up interval, wherein the wake-up frame is a wake-up frame that is continuously sent by a collection node. The device node is configured to, in response to that the device node has detected the wake-up frame, monitor the wake-up frame using the monitoring duration at a second wake-up interval, wherein the first wake-up interval is greater than the second wake-up interval, and a duration of the wake-up frame is greater than the monitoring duration.

The device node is configured to, in response to that the device node fails to detect the wake-up frame within a preset duration when monitoring the wake-up frame at the second wake-up interval, enter a receiving state, so as to perform wireless communication between the collection node and the device node.

The embodiments of the present disclosure further provide a node device, including:

one or more memories, configured to store executable computer-readable instructions;

one or more processors, configured to implement, when executing the executable computer-readable instructions, the operations of the above-mentioned wireless communication method.

The embodiments of the present disclosure further provide a non-volatile computer-readable storage medium, wherein the non-volatile computer-readable storage medium stores executable computer-readable instructions; and the executable computer-readable instructions, when executed by one or more processors, implement the operations of the above-mentioned wireless communication method.

BRIEF DESCRIPTION OF THE DRAWINGS

In order to describe the embodiments of the disclosure or the technical solutions in the related art more clearly, drawings required to be used in the illustration of the embodiments or the related art will be briefly introduced below. Apparently, the drawings in the illustration below are only some embodiments of the present disclosure. Those having ordinary skill in the art also may obtain other drawings according to the provided drawings without creative work.

DETAILED DESCRIPTION

The embodiments of the present disclosure provide a wireless communication method, a wireless communication system, a node device, and a non-volatile computer-readable storage medium, which may reduce the power consumption of a device node and prolong the service life of a battery.

In order to make the objectives, technical schemes and advantages of the embodiments of the present disclosure clearer, the technical schemes in the embodiments of the present disclosure will be described clearly and completely below in combination with the drawings in the embodiments of the present disclosure. Apparently, the embodiments described are part of the embodiments of the present disclosure, not all the embodiments. Based on the embodiments in present disclosure, all other embodiments obtained by those having ordinary skill in the art without creative work shall fall within the protection scope of the present disclosure.

Figure 1:
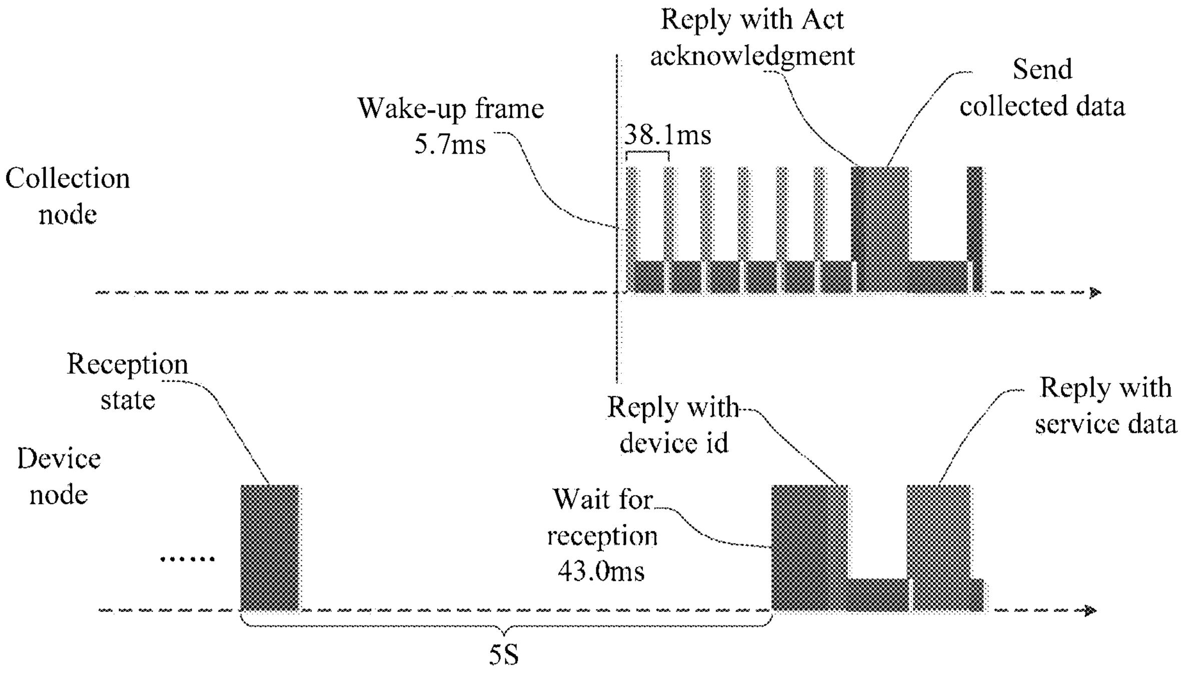
FIG. 1 is a timing diagram of a wireless communication method in the related art according to one or more embodiments of the present disclosure.

Referring to FIG. 1, FIG. 1 is a timing diagram of a wireless communication method in the related art according to one or more embodiments of the present disclosure.

In the related technologies, in order to reduce the power consumption and prolong the service life and lifespan of a battery, regular dormancy is generally performed, and collection nodes adopt a certain policy to perform wireless wake-up communication. Usually, a device node wakes up at a certain interval to detect whether any collection node has communication requirements. The wake-up duration should cover two wake-up frames of the collection node (as shown in FIG. 1) to maintain the reliability and stability of the wireless wake-up communication. There will be a significant increase in power consumption of the device node in a wake-up interval relative to power consumption in a dormancy interval, resulting in an increase in average power consumption. This reduces the utilization rate of electric energy, and also increases the costs of using a device node.

Therefore, the embodiments of the present disclosure provide a wireless communication method. A wake-up frame of a collection node is monitored by a device node using a monitoring duration at a first wake-up interval; in response to that the wake-up frame has been detected, the device node monitors the wake-up frame at a shorter second wake-up interval; in response to that the device node fails to detect the wake-up frame within a preset duration when monitoring the wake-up frame at the second wake-up interval, it is determined that the device node and the collection node enter a sending/receiving state and may perform wireless communication. As the monitoring duration used is less than a duration of the wake-up frame, the power consumption of wake-up monitoring at each time is reduced to a small value, which may avoid waste of electric energy and reduce the usage cost of the device node.

The wireless communication method provided by the present disclosure will be described below through one embodiment.

Figure 2:
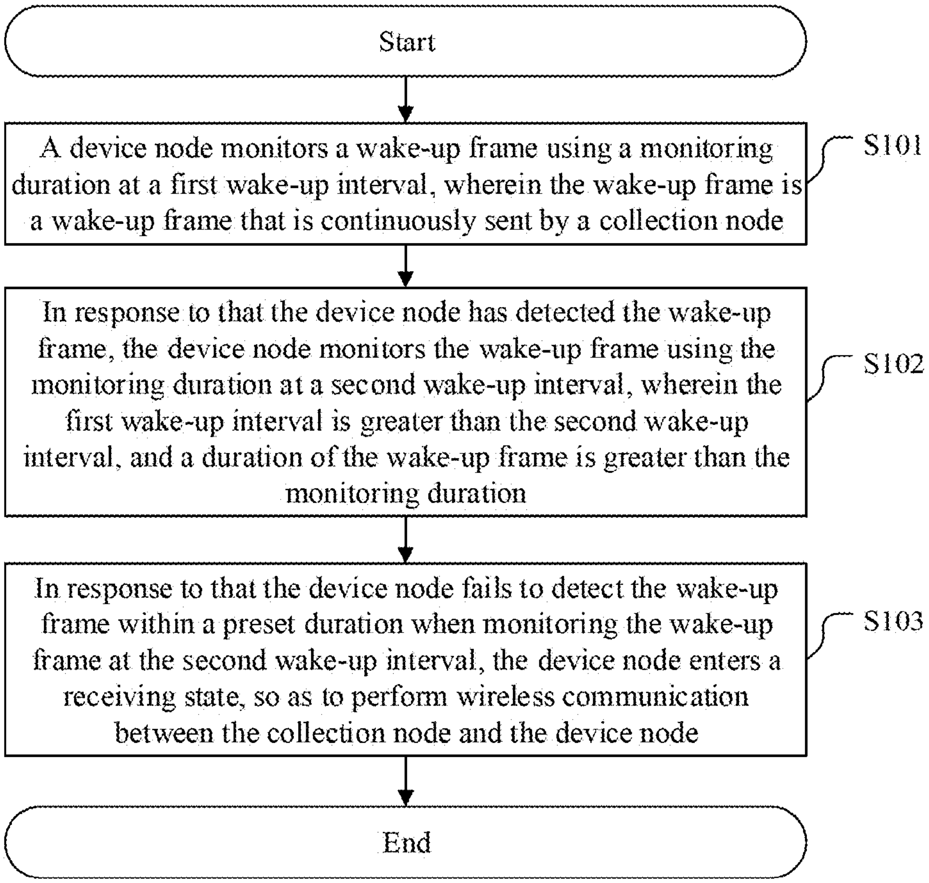
FIG. 2 is a flowchart of a wireless communication method according to one or more embodiments of the present disclosure.

Referring to FIG. 2, FIG. 2 is a flowchart of a wireless communication method according to one or more embodiments of the present disclosure.

In this embodiment, the method may include the following operations S101 to S103.

At operation S101, a device node monitors a wake-up frame using a monitoring duration at a first wake-up interval, wherein the wake-up frame is a wake-up frame that is continuously sent by a collection node.

Therefore, in this operation, the device node monitors the wake-up frame using the monitoring duration at the first wake-up interval, wherein the wake-up frame is a wake-up frame that is continuously sent by the collection node, and a duration of the wake-up frame is greater than the monitoring duration.

The device node serves as a responder of the wireless communication, and is configured to make a response to the wireless communication with the collection node and upload device running information. The device node powered by a battery has an extremely high requirement for low power consumption. In this embodiment, the device node is powered by a battery, so it is necessary to control the power consumption.

As the implementation of this operation is before the wireless communication, the device node needs to be in a low-power-consumption state and also needs to keep stably monitoring the collection node. Therefore, the device node may monitor the wake-up frame using the monitoring duration at a longer first wake-up interval, and the wake-up frame is a wake-up frame that is continuously sent by the collection node. Therefore, it may be ensured to successfully detect the wake-up frame at most within the first wake-up interval and then perform a subsequent operation. As the wake-up frame is the wake-up frame that is continuously sent by the collection node, the problem of missing the wake-up frame by the device node is avoided.

Further, the duration of the wake-up frame in this embodiment is much greater than the duration of a wake-up frame in the related art, so as to ensure that the wake-up frame sent to the device node will not be missed. Therefore, the wake-up frame in this embodiment may be referred to as an ultra-long wake-up frame.

At operation S102, in response to that the device node has detected the wake-up frame, the device node monitors the wake-up frame using the monitoring duration at a second wake-up interval, wherein the first wake-up interval is greater than the second wake-up interval, and the duration of the wake-up frame is greater than the monitoring duration.

Based on the operation S101, this operation makes the device node monitor the wake-up frame using the monitoring duration at the second wake-up interval in response to that the device node has detected the wake-up frame, wherein the first wake-up interval is greater than the second wake-up interval, and the duration of the wake-up frame is greater than the monitoring duration.

It may be concluded that, when the device node has detected the wake-up frame, the device node still maintains a monitoring state and shortens the monitoring interval, which means switching from the longer first wake-up interval to the shorter second wake-up interval, so as to timely monitor changes in a state of the collection node for sending wake-up frames.

The first wake-up interval is longer than the second wake-up interval. In some exemplary implementations, the first wake-up interval may be much greater than the second wake-up interval. Alternatively, the first wake-up interval may be a preset multiple of the second wake-up interval. For example, the first wake-up interval may be set to be five seconds, and the second wake-up interval may be set to be one second. In this way, in the process of monitoring at the first wake-up interval, it is only necessary to perform wake-up every five seconds. The monitoring duration after wake-up is shorter than the duration of the wake-up frame, which may greatly reduce the power consumption during wake-up compared to the related art. Further, in the wireless communication process, it is possible to perform monitoring at the shorter second wake-up interval, so as to determine the state of the collection node in a timely manner.

At operation S103, in response to that the device node fails to detect the wake-up frame within a preset duration when monitoring the wake-up frame at the second wake-up interval, the device node enters a receiving state, so as to perform wireless communication between the collection node and the device node.

Based on the operation S102, this operation makes the device node enter the receiving state in response to that the device node fails to detect the wake-up frame within the preset duration when monitoring the wake-up frame at the second wake-up interval, so as to perform wireless communication between the collection node and the device node. In the monitoring process within the second wake-up interval, when the device node fails to detect the wake-up frame within the preset duration, it indicates that the collection node has entered a wireless communication state and needs to perform the wireless communication with the device node. In order to cooperate with the collection node, the device node enters the receiving state and performs the wireless communication with the collection node.

The preset duration may be equal to the second wake-up interval, so that in the next monitoring of the device node, when the device node does not monitor the wake-up frame during wake-up, the device node may enter the receiving state, which may improve the timeliness of state switching and may improve the efficiency of wireless communication.

In some embodiments, the process that the collection node sends the wake-up frame may include the following operations 1 and 2.

At operation 1, the collection node continuously sends the wake-up frame for a set total duration.

At operation 2, the collection node enters a silent state after the sending of the wake-up frame is completed.

Therefore, in this embodiment, the process that the collection node sends the wake-up frame may include the following operations. The collection node continuously sends the wake-up frame according to the set total duration, and the collection node enters the silent state after the sending of the wake-up frame is completed. Generally, in this embodiment, in the scenario where the collection node communicates with the device node, the collection node is close to the device node, which may maintain a reliable and stable communication. Therefore, it can be considered by default that the wake-up frame sent by the collection node and having a total duration greater than the first wake-up interval is able to be normally received by the device node, which may ensure a stable communication between the device node and the collection node. To ensure that the device node may be fully prepared, the total duration shall be set to be slightly longer than the first wake-up interval. For example, when the first wake-up interval is five seconds, the total duration may be seven seconds, eight seconds, or the like.

Further, when the collection node enters the silent state, that is, when the collection node sends information to the device node, it indicates that the collection node currently enters a data sending state, and the device node is required to enter the receiving state.

Correspondingly, the operation of "performing the wireless communication between the collection node and the device node" in this embodiment includes:

when the silent state is maintained for the preset duration, the collection node sends an id wake-up frame (i.e., an id frame serves as the wake-up frame) to the device node, so that the device node performs communication based on the id wake-up frame.

In this operation, after staying in the silent state for the preset duration, the collection node may directly send data to the device node without a need for sending an acknowledgment frame or other data. The preset duration may be equal to the second wake-up interval.

Further, the device node performs communication based on the id wake-up frame, which may include:

when a control domain of the id wake-up frame is a function frame, the device node sends corresponding service data to the collection node based on the function frame.

Therefore, how to perform the communication is mainly described in this exemplary solution. In this exemplary solution, when a control domain of the id wake-up frame is a function frame, the device node sends the corresponding service data to the collection node based on the function frame. The function frame refers to a function frame indicating that the collection node requires the device node to perform some functions, and the device node may directly feed back the corresponding service data based on the function frame.

Further, the device node performs communication based on the id wake-up frame, which may include the following operations 1 and 2.

At operation 1, when a control domain of the id wake-up frame is a wake-up frame, the device node sends an acknowledgment frame to the collection node.

At operation 2, the device node enters the receiving state.

Therefore, how to perform the communication is mainly described in this exemplary solution. In this exemplary solution, when a control domain of the id wake-up frame is a wake-up frame, the device node sends an acknowledgment frame to the collection node, and the device node enters the receiving state. Therefore, in this exemplary solution, the device node may send the corresponding acknowledgment frame based on the wake-up frame, so as to enter the receiving state based on the acknowledgment frame.

Further, based on the above exemplary solutions, this embodiment may further include the following operations.

At operation 1, in response to receiving the acknowledgment frame, the collection node sends a collection frame, so that the device node returns corresponding service data based on the collection frame.

At operation 2, the collection node receives the service data, and replies with an acknowledgment frame.

Therefore, in this exemplary solution, in response to receiving the acknowledgment frame, the collection node sends the collection frame, so that the device node returns corresponding service data based on the collection frame. The collection node receives the service data, and replies with the acknowledgment frame. That is, when receiving the acknowledgment frame, the collection node completes corresponding data interaction based on the acknowledgment frame.

Further, when the device node receives the id wake-up frame, the wireless communication method may further include the following operations 1 and 2.

At operation 1, a power consumption control field is acquired from the id wake-up frame.

At operation 2, power used in a communication process is set based on the power consumption control field.

Therefore, in this exemplary solution, the power for the wireless communication may also be controlled based on the power consumption control field in the wake-up frame. In this exemplary solution, the power consumption control field is acquired from the id wake-up frame, and the power used in the communication process is set based on the power consumption control field. The power consumption control field may be low power consumption, medium power consumption, and high power consumption.

When the device node enters the receiving state, the wireless communication method may further include:

- when no data is received within the preset duration, the device node monitors the wake-up frame using the monitoring duration at the first wake-up interval.

Therefore, this exemplary solution mainly explains how to operate when no data is received. In this exemplary solution, when no data is received within the preset duration, the device node monitors the wake-up frame using the monitoring duration at the first wake-up interval.

In summary, in this embodiment, a wake-up frame of a collection node is monitored by a device node using a monitoring duration at a first wake-up interval; in response to that the wake-up frame has been detected, the device node monitors the wake-up frame at a shorter second wake-up interval; in response to that the device node fails to detect the wake-up frame within a preset duration when monitoring the wake-up frame at the second wake-up interval, it is determined that the device node and the collection node enter a sending/receiving state and may perform wireless communication. As the monitoring duration used is less than a duration of the wake-up frame, the power consumption of wake-up monitoring at each time is reduced to a small value, which may avoid waste of electric energy and reduce the usage cost of the device node.

The wireless communication method provided by the present disclosure will be further described below through one exemplary embodiment.

Figure 3:
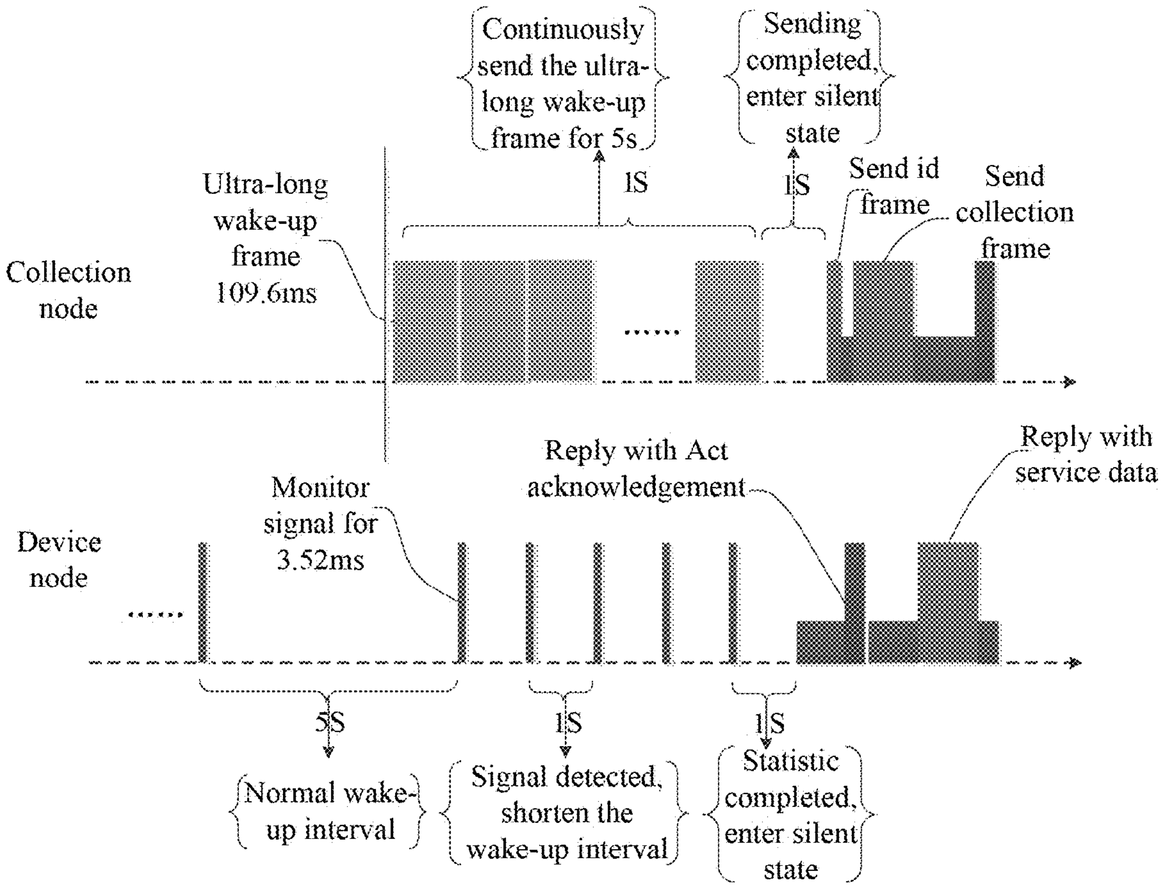
FIG. 3 is a schematic timing diagram of a wireless communication method according to one or more embodiments of the present disclosure.

Referring to FIG. 3, FIG. 3 is a schematic timing diagram of a wireless communication method according to one or more embodiments of the present disclosure.

This embodiment changes functions during wake-up, and only monitors signals at each wake-up. Receiving duration during the wake-up does not need to cover two wake-up frames, and the device node only needs to comply with the rules of a collection node in terms of flow. This embodiment significantly shortens the receiving duration during the wake-up. For example, the wake-up duration may be shortened from 43 ms to 3.21 ms, to achieve a main goal of reducing the power consumption. At the same time, some other policies are also used to form a complete collection solution having low power consumption.

In this embodiment, the method may include the following operations 1 to 9.

At operation 1, a device node performs monitoring at a wake-up interval (for example, the device node performs monitoring once at every five seconds) (only wake-up frames are monitored in the present embodiment, while according to the monitoring solution in the related art, the monitoring duration needs to at least cover one collection interval); and when no wake-up frame sent by a collection node has been detected, the device node continues to sleep.

At operation 2, after the device node has detected an ultra-long wake-up frame, the device node shortens the wake-up interval to one second.

At operation 3, when the device node fails to detect the ultra-long wake-up frame within one second, the device node transits to a receiving state and remains silent for one second to wait to receive an id wake-up frame.

At operation 4, when the collection node needs to collect data, the collection node continuously sends the ultra-long wake-up frame, with a total duration that is equal to one wake-up interval (five seconds).

At operation 5, after completing the continuous sending, the collection node remains silent for one second and then sends an id wake-up frame.

At operation 6, after the device node receives the id wake-up frame, the device node parses a control domain, when the control domain is a function frame, the device node directly sends service data and executes operation 9; and when the control domain is a wake-up frame, the device node replies with an acknowledgment frame and transits to the receiving state.

At operation 7, the collection node sends a collection frame after receiving the acknowledgment frame.

At operation 8, the device node replies with service data after receiving the collection frame.

At operation 9, the collection node replies with an acknowledgment frame after receiving the service data. The collection process ends.

With respect to the ultra-long wake-up frame, a wireless module manufacturer will usually provide a frame structure design consisting of a preamble, a synchronization code, and a data field. In this embodiment, when a wake-up frame is used, an address field and bytes in a preamble frame are designed to be the same data, so that the entire wake-up frame has a wake-up function, that is, the ultra-long wake-up frame mentioned in operation 4 (with a duration of about 109 ms) has the wake-up function. For the structure of the ultra-long wake-up frame, please refer to FIG. 4.

Figure 4:
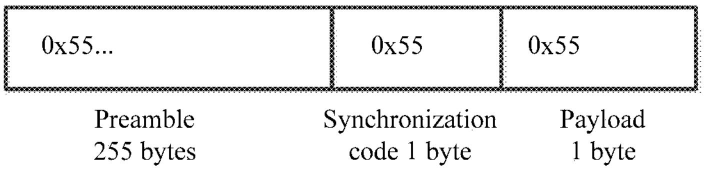
FIG. 4 is a schematic structural diagram of an ultra-long wake-up frame of a wireless communication method according to one or more embodiments of the present disclosure.

FIG. 4 is a schematic structural diagram of an ultra-long wake-up frame of a wireless communication method according to one or more embodiments of the present disclosure.

Further, a power consumption control field may also be added to the structure of the id wake-up frame, and low-power-consumption communication is used by default. For a device node that fails in communication for multiple times, the sending power of the device node may be increased.

Further, a control domain field may also be added to the structure of the id wake-up frame. When the control domain is a specified function, the device node directly replies with service data according to the function, so as to save one round of communication interaction.

In addition, in this embodiment, a communication frequency between the transmitting and receiving nodes may also be specified. An address low byte may be used as a frequency point for division into a plurality of channels. Dividing device nodes into different cellular areas according to the addresses of the device nodes may avoid waking up unrelated devices during communication.

It is obvious that a collaborative mechanism between the transmitting and receiving nodes in this embodiment may significantly reduce the receiving duration when a device node wakes up and reduce the main power consumption. In the ultra-long wake-up frame, the 255-byte preamble, the 1-byte synchronization code, and the 1-byte data field are all set to be 55, so that wake-up frame data sent by the transmitting node is consistent, the wake-up duration is extended to the maximum, and it is convenient to cover the regular wake-up interval of the receiving node. A wireless transceiver chip of Silicon Labs is taken as an example, a duration of an ultra-long wake-up frame time may reach 109.6 ms. In consideration of the user experience and the power consumption, the total continuous sending duration may be designed to be five seconds.

Furthermore, channels are planned according to addresses. Both the transmitting node and the receiving node select corresponding channels for communication based on an agreed address rule, which avoids waking up unrelated devices. A collection node determines sending power of a device node. Flexible customization of policies reduces the power consumption of most device nodes. The id wake-up frame contains control domain, allowing the device node to directly reply with the service data and saving one round of communication interaction.

In summary, in this embodiment, a wake-up frame of a collection node is monitored by a device node using a monitoring duration at a first wake-up interval; in response to that the wake-up frame has been detected, the device node monitors the wake-up frame at a shorter second wake-up interval; in response to that the device node fails to detect the wake-up frame within a preset duration when monitoring the wake-up frame at the second wake-up interval, it is determined that the device node and the collection node enter a sending/receiving state and may perform wireless communication. As the monitoring duration used is less than a duration of the wake-up frame, the power consumption of wake-up monitoring at each time is reduced to a small value, which may avoid waste of electric energy and reduce the usage cost of the device node.

A wireless communication system provided in the embodiments of the present disclosure is introduced below. The wireless communication system described below and the wireless communication method described above may refer to each other.

Figure 5:
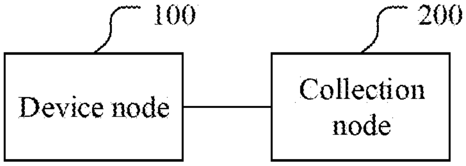
FIG. 5 is a schematic structural diagram of a wireless communication system according to one or more embodiments of the present disclosure.

Referring to FIG. 5, FIG. 5 is a schematic structural diagram of a wireless communication system according to one or more embodiments of the present disclosure.

In this embodiment, the system may include:

a device node 100 and a collection node 200.

The device node 100 is configured to monitor a wake-up frame using a monitoring duration at a first wake-up interval, wherein the wake-up frame is a wake-up frame that is continuously sent by the collection node 200; the device node is configured to, in response to that the device node 100 has detected the wake-up frame, monitor the wake-up frame using the monitoring duration at a second wake-up interval, wherein the first wake-up interval is greater than the second wake-up interval, and a duration of the wake-up frame is greater than the monitoring duration; and the device node is configured to, in response to that the device node 100 fails to detect the wake-up frame within a preset duration when monitoring the wake-up frame at the second wake-up interval, enter a receiving state, so as to perform wireless communication between the collection node 200 and the device node 100.

Figure 6:
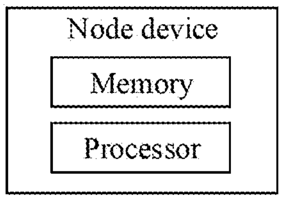
FIG. 6 is a schematic structural diagram of a node device according to one or more embodiments of the present disclosure.

The embodiments of the present disclosure further provide a node device, as shown in FIG. 6, including:

- one or more memories, configured to store executable computer-readable instructions;
- one or more processors, configured to implement, when executing the executable computer-readable instructions, the operations of the wireless communication method in the above embodiments.

The embodiments of the present disclosure further provide a non-volatile computer-readable storage medium. The non-volatile computer-readable storage medium stores executable computer-readable instructions; and the executable computer-readable instructions, when executed by one or more processors, implement the operations of the wireless communication method in the above embodiments.

All the embodiments in the specification are described in a progressive manner. Contents mainly described in each embodiment are different from those described in other embodiments. Same or similar parts of all the embodiments refer to each other. For the device disclosed in the embodiments, since it corresponds to the method disclosed in the embodiments, the description is relatively simple, and the relevant part may be referred to the description of the method part.

Professionals may further realize that in connection with the units and algorithm operations of all examples described in the embodiments disclosed herein, they may be implemented by electronic hardware, computer software or a combination of electronic hardware and computer software. In order to clearly describe the interchangeability of hardware and software, the constitutions and operations of all the examples have been generally described according to functions in the above illustration. Whether these functions are executed by hardware or software depends on the specific application and design constraints of the technical solution. Professionals and technicians may use different methods for each specific application to realize the described functions, but such implementation should not be considered as being beyond the scope of the present disclosure.

The operations of a method or algorithm described in conjunction with the embodiments disclosed herein may be directly implemented in hardware, a software module executed by one or more processors, or a combination of the hardware and the software module. The software module may be placed in a Random Access Memory (RAM), an internal memory, a Read Only Memory (ROM), an electrically programmable ROM, an electrically erasable programmable ROM, a register, a hard disk, a mobile disk, a CD-ROM, or any storage medium in other forms known to the technical field.

The wireless communication method, the wireless communication system, the node device, and the non-volatile computer-readable storage medium provided in the present disclosure are described in detail above. The principles and implementations of the present disclosure are described herein by using specific examples, and the descriptions of the above embodiments are only used to help understand the method of the present disclosure and the core idea of the method. It should be pointed out that for those skilled in the art, without departing from the principle of the present disclosure, several improvements and modifications may also be made to the present disclosure, and these improvements and modifications also fall within the protection scope of the claims of the present disclosure.

What is claimed is:

1. A wireless communication method, comprising:

monitoring, by a device node, a wake-up frame using a monitoring duration at a first wake-up interval, wherein the wake-up frame is a wake-up frame that has a duration greater than the monitoring duration and is continuously sent by a collection node for a set total duration greater than or equal to the first wake-up interval, wherein the collection node enters a silent state after the sending of the wake-up frame is completed, and wherein, in response to that the silent state is maintained for a preset duration, the collection node sends an id wake-up frame to the device node;

in response to that the device node has detected the wake-up frame, monitoring, by the device node, the wake-up frame using the monitoring duration at a second wake-up interval, wherein the first wake-up interval is greater than the second wake-up interval; and in response to that the device node fails to detect the wake-up frame within the preset duration when monitoring the wake-up frame at the second wake-up interval, entering, by the device node, a receiving state to receive the id wake-up frame from the collection node, so as to perform wireless communication between the collection node and the device node based on the id wake-up frame.

2. The wireless communication method according to claim 1, wherein performing wireless communication between the collection node and the device node based on the id wake-up frame comprises:

in response to that a control domain of the id wake-up frame is a function frame, sending, by the device node, corresponding service data to the collection node based on the function frame.

3. The wireless communication method according to claim 1, wherein performing wireless communication between the collection node and the device node based on the id wake-up frame comprises:

in response to that a control domain of the id wake-up frame is a wake-up frame, sending, by the device node, an acknowledgment frame to the collection node; and entering, by the device node, the receiving state.

4. The wireless communication method according to claim 3, further comprising:

in response to receiving the acknowledgment frame, sending a collection frame by the collection node, so that the device node returns corresponding service data based on the collection frame; and receiving the service data and replying with an acknowledgment frame by the collection node.

5. The wireless communication method according to claim 1, wherein when the device node receives the id wake-up frame, the wireless communication method further comprises:

acquiring a power consumption control field from the id wake-up frame; and setting, based on the power consumption control field, power used in a communication process.

6. The wireless communication method according to claim 5, wherein when the device node enters the receiving state, the wireless communication method further comprises:

in response to that no data is received within the preset duration, monitoring, by the device node, a wake-up frame using the monitoring duration at the first wake-up interval.

7. The wireless communication method according to claim 1, wherein the device node serves as a responder of the wireless communication, and is configured to make a response to the wireless communication with the collection node and upload device running information.

8. The wireless communication method according to claim 1, wherein during the monitoring, by the device node, the wake-up frame using the monitoring duration at the first wake-up interval, the wireless communication method further comprises:

controlling power consumption of the device node, wherein the device node is powered by a battery.

9. The wireless communication method according to claim 1, wherein before the monitoring, by the device node, the wake-up frame using the monitoring duration at the first wake-up interval, the wireless communication method further comprises:

setting the device node to be in a low-power-consumption mode.

10. The wireless communication method according to claim 1, wherein in response to that the device node has detected the wake-up frame, the wireless communication method further comprises:

switching the longer first wake-up interval to the shorter second wake-up interval.

11. The wireless communication method according to claim 1, wherein in response to that the device node fails to detect the wake-up frame within the preset duration when monitoring the wake-up frame at the second wake-up interval, the wireless communication method further comprises:

when the preset duration is equal to the second wake-up interval, in a next monitoring of the device node, when the device node fails to detect the wake-up frame during wake-up, entering, by the device node, the receiving state.

12. The wireless communication method according to claim 1, wherein performing the wireless communication between the collection node and the device node further comprises:

in response to that the silent state is maintained for the preset duration and the collection node does not need to send an acknowledgment frame again, sending, by the collection node, data to the device node.

13. The wireless communication method according to claim 1, when the device node performs the communication based on the id wake-up frame, comprising:

in response to that a control domain of the id wake-up frame is a function domain, sending, by the device node, corresponding service data to the collection node based on the function frame.

14. The wireless communication method according to claim 4, further comprising:

in response to receiving the acknowledgment frame, completing, by the collection node, corresponding data interaction based on the acknowledgment frame.

15. The wireless communication method according to claim 5, wherein the power control field comprises low power consumption, medium power consumption, and high power consumption.

16. A wireless communication system, comprising a device node and a collection node, wherein the collection node is configured to continuously send a wake-up frame for a set total duration greater than or equal to a first wake-up interval, enter a silent state after the sending of the wake-up frame is completed, and in response to that the silent state is maintained for a preset duration, send an id wake-up frame to the device node, wherein the wake-up frame is a wake-up frame that has a duration greater than a monitoring duration;

the device node is configured to monitor the wake-up frame using the monitoring duration at the first wake-up interval;

the device node is configured to, in response to that the device node has detected the wake-up frame, monitor the wake-up frame using the monitoring duration at a second wake-up interval, wherein the first wake-up interval is greater than the second wake-up interval; and the device node is configured to, in response to that the device node fails to detect the wake-up frame within the preset duration when monitoring the wake-up frame at the second wake-up interval, enter a receiving state to receive the id wake-up frame from the collection node, so as to perform wireless communication between the collection node and the device node based on the id wake-up frame.

17. A node device, comprising:

one or more memories, configured to store executable computer-readable instructions;

one or more processors, configured to implement, when executing the executable computer-readable instructions, the operations of the wireless communication method according to claim 1.

18. A non-transitory non-volatile computer-readable storage medium, wherein the non-transitory non-volatile computer-readable storage medium stores executable computer-readable instructions; and the executable computer-readable instructions, when executed by one or more processors, implement the following operations:

monitoring, by a device node, a wake-up frame using a monitoring duration at a first wake-up interval, wherein the wake-up frame is a wake-up frame that has a duration greater than the monitoring duration and is continuously sent by a collection node for a set total duration greater than or equal to the first wake-up interval, wherein the collection node enters a silent state after the sending of the wake-up frame is completed, and wherein, in response to that the silent state is maintained for a preset duration, the collection node sends an id wake-up frame to the device node;

in response to that the device node has detected the wake-up frame, monitoring, by the device node, the wake-up frame using the monitoring duration at a second wake-up interval, wherein the first wake-up interval is greater than the second wake-up interval; and in response to that the device node fails to detect the wake-up frame within the preset duration when monitoring the wake-up frame at the second wake-up interval, entering, by the device node, a receiving state to receive the id wake-up frame from the collection node, so as to perform wireless communication between the collection node and the device node based on the id wake-up frame.

* * * * *